United States Patent
Habib et al.

(10) Patent No.: US 9,383,096 B2
(45) Date of Patent: Jul. 5, 2016

(54) CARBON-FREE LOW-$NO_x$ LIQUID FUEL OXYGEN TRANSPORT REACTOR FOR INDUSTRIAL WATER TUBE BOILERS

(71) Applicant: King Fahd University of Petroleum and Minerals, Dhahran (SA)

(72) Inventors: Mohamed Abdel-Aziz Habib, Dhahran (SA); Medhat Ahmed Nemitallah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 401 days.

(21) Appl. No.: 14/139,209

(22) Filed: Dec. 23, 2013

(65) Prior Publication Data

US 2015/0176487 A1 Jun. 25, 2015

(51) Int. Cl.
| | |
|---|---|
| *B01D 63/06* | (2006.01) |
| *F23C 5/08* | (2006.01) |
| *F23L 7/00* | (2006.01) |
| *B01D 69/04* | (2006.01) |
| *F23D 11/44* | (2006.01) |

(52) U.S. Cl.
CPC . *F23C 5/08* (2013.01); *B01D 63/06* (2013.01); *B01D 69/04* (2013.01); *F23D 11/443* (2013.01); *F23L 7/007* (2013.01); *Y02E 20/344* (2013.01)

(58) Field of Classification Search
CPC ............... F02C 3/22; F02C 3/34; F23C 5/08; F23D 11/443; F23L 7/007; Y02E 20/344; B01D 63/06; B01D 69/04; B01D 2257/104; B01D 2257/702

USPC ......... 60/39.461, 39.462, 722, 39.52; 96/4, 8, 96/10, 7; 95/50, 54
See application file for complete search history.

(56) References Cited

U.S. PATENT DOCUMENTS

| | | | |
|---|---|---|---|
| 4,791,079 A | 12/1988 | Hazbun | |
| 5,306,411 A | 4/1994 | Mazanec et al. | |
| 5,702,999 A | 12/1997 | Mazanec et al. | |
| 5,723,074 A | 3/1998 | Balachandran et al. | |
| 5,820,654 A | 10/1998 | Gottzman et al. | |
| 5,820,655 A | 10/1998 | Gottzmann et al. | |
| 6,010,614 A * | 1/2000 | Keskar | B01D 53/22 205/763 |
| 6,139,810 A * | 10/2000 | Gottzmann | B01J 8/009 422/201 |

(Continued)

*Primary Examiner* — Steven Sutherland
(74) *Attorney, Agent, or Firm* — Oblon, McClelland, Maier & Neustadt, L.L.P

(57) ABSTRACT

An oxygen transport reactor for boiler furnaces and gas turbine combustors that utilizes a liquid fuel that is oxidized as a gaseous fuel in a membrane reactor. A liquid fuel is introduced by vaporizing the fuel inside a porous pipe surrounded by an annulus reaction zone which is surrounded by an annulus air zone. An oxygen transport membrane separates the annulus reaction zone containing the porous vaporized fuel and sweeping $CO_2$ from the air feed side zone. Oxygen is transported from the outer annulus through the membrane to the annulus reaction zone containing the vaporized fuel and sweeping $CO_2$. Fuel is first cracked to very small droplets in the intake fuel atomizer utilizing part of the intake $CO_2$ then completely vaporized inside the porous pipe utilizing the heat coming from the surrounding reaction zone. The oxygen transport reactor is applicable for carbon free boiler furnaces and gas turbine combustors which utilize oxygen transport reactors for combined oxygen separation and combustion.

6 Claims, 3 Drawing Sheets

(56) References Cited

U.S. PATENT DOCUMENTS

| | | | |
|---|---|---|---|
| 6,394,043 B1* | 5/2002 | Bool, III | B01B 1/005 122/31.1 |
| 8,117,822 B2 | 2/2012 | Habib et al. | |
| 2005/0037299 A1 | 2/2005 | Gottzmann | |
| 2006/0230762 A1* | 10/2006 | Hamrin | B01D 53/22 60/650 |
| 2011/0132280 A1 | 6/2011 | Habib et al. | |
| 2013/0139810 A1 | 6/2013 | Habib et al. | |
| 2013/0199425 A1 | 8/2013 | Ghoniem et al. | |

* cited by examiner

CARBON-FREE LOW-NO$_x$ LIQUID FUEL OXYGEN TRANSPORT REACTOR FOR INDUSTRIAL WATER TUBE BOILERS

BACKGROUND

1. Field of the Disclosure

The invention relates to a fuel oxygen transport reactor that may be used together with a turbine and/or a water tube boiler and a method of operating an oxygen transport reactor to obtain full evaporation of a liquid fuel prior to contact and combustion with an oxygen-enriched atmosphere.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Fossil fuels are considered to be a main source of energy for the developed and developing world. Fossil fuels produce $CO_2$ which is thought to be a main contributor of global warming (Habib M. A., Nemitallah M. A., Ben-Mansour R., Recent Development in Oxy-Combustion Technology and Its Applications to Gas Turbine Combustors and ITM Reactors, dx.doi.org/10.1021/ef301266j; Energy Fuels 2013, 27, 2-19, incorporated herein by reference). Due to the shortage of natural gas, liquid fuels are presently being heavily used. As well, liquid fuels are byproduct of other process industries and are being used along with natural gas for producing steam and energy.

Liquid fuels produce large amounts of carbon dioxide. In order to capture $CO_2$, different techniques are currently available and include technologies of pre-combustion, post-combustion and oxyfuel combustion. As a promising CCS technology, oxyfuel combustion can be used to existing and new power plants (B. J. P. Buhre, L. K. Elliott, C. D. Sheng, R. P. Gupta, T. F. Wall, Prog. Energy Combust. Sci. 31 (2005) 283-307, incorporated herein by reference). In oxycombustion, a fuel is oxidized in a nearly nitrogen-free, diluted mixture such that the products consist mainly of $CO_2$ and water vapor, enabling a relatively simple and inexpensive condensation separation process (Nemitallah M. A., Habib M. A., Ben Mansour R., Investigations of oxy-fuel combustion and oxygen permeation in an ITM reactor using a two-step oxycombustion reaction kinetics model, Journal of Membrane Science 2013, 432, 1-12, incorporated herein by reference).

For this process, the required pure oxygen is obtained via cryogenic distillation. This process of separation of $O_2$ is very costly (Sundkvist S, Griffin T, Thorshaug N. AZEP e development of an integrated air separation membrane e gas turbine. In: Second Nordic Mini symposium on Carbon Dioxide Capture and Storage, Goteborg, Sweden, Oct. 26, 2001, pp. 52-57, incorporated herein by reference). The thermodynamic and economic penalties incurred by the use of cryogenic air separation unit could easily offset any advantages gained by oxyfuel combustion. Such short comings have prompted many researchers to investigate the use of alternative air separation systems. One of the alternatives to separation of oxygen from air is the use of Ion Transport Membranes (ITMs) which may reduce the penalty of air separation units in oxycombustion. These ITMs have the capability of separating the oxygen from air at elevated temperature typically above 700° C. Oxygen permeation through these membranes is a function of partial pressure of oxygen across the membranes, membrane thickness and temperature at which these membranes are operating (U. Balachandran, M. S. Kleefisch, T. P. Kobylinski, S. L. Morissette, S. Pei, Oxygen ion-conducting dense ceramic membranes (Assigned to Amoco Co.), U.S. Pat. No. 5,639,437 (1997), incorporated herein by reference). The use of membranes in gas separation processes has been predicted to increase by a factor of five by 2020 (Bernardo P, Drioli E, Golemme G. Membrane gas separation: a review of state of the art. Industrial Chemical Engineering 2009; 48(1):4638-63, incorporated herein by reference), and many studies are currently being conducted to improve the chemical stability and performance under more demanding operational conditions.

Membrane reactor technology is a promising technology and it may be applied for carbon capture by direct combustion of permeated oxygen in the permeate side of the membrane with fuel or this technology can be used for the production of hydrogen from natural gas (Rahimpour M R, Mirvakili A, Paymooni K. A novel water perm-selective membrane dual-type reactor concept for Fischer Tropsch synthesis of GTL (gas to liquid) technology. ENERGY 2011, 36, 1223-1235, incorporated herein by reference). The membrane reactor is a novel technology for the production of hydrogen from natural gas. It may provide hydrogen production, e.g. at refueling stations and has the potential of inexpensive $CO_2$ separation (Sjardin M, Damen K J, Faaij A P. Techno-economic prospects of small-scale membrane reactors in a future hydrogen-fuelled transportation sector. ENERGY 2006, 31, 2523-2555, incorporated herein by reference). In a recent study (Ben-Mansour R., Habib M., Badr H., Uddin A., Nemitallah M. A., Characteristics of Oxy-fuel Combustion in an Oxygen Transport Reactor, Energy Fuels. 2012, dx.doi.org/10.1021/ef300539c Energy Fuels 2012, 26, 4599-4606, incorporated herein by reference), the characteristics of oxyfuel combustion in an oxygen transport reactor (OTR) have been investigated. In this work, cylindrical reactor walls were made of dense, nonporous, mixed-conducting ceramic membranes that only allow oxygen permeation from the outside air into the combustion chamber and the simulations have been done for different composition of $CH_4/CO_2$ mixtures and for different mass flow rates. The comparison between reactive and separation-only OTR units showed that combining reaction and separation increases significantly $O_2$ permeation rate to about 2.5 times as compared to the case of separation only. Mancini and Mitsos (Mancini N D, Mitsos A. Ion transport membrane reactors for oxy-combustion part II: analysis and comparison of alternatives. ENERGY, 2011, 36(8):4721, 39, incorporated herein by reference) conducted a comparison between reactive and separation-only ITMs to assess the relative merits and disadvantages of each on an ITM monoliths structure reactor for co-current and counter-current flow configuration. They have developed an oxygen permeation model taking into account the effects of oxy-combustion in the permeate side of the membrane based (Mancini N D, Mitsos A. Ion transport membrane reactors for oxy-combustion e Part I: intermediate fidelity Modeling, ENERGY 2011, 36, 4701-4720, incorporated herein by reference). The results show that although a reactive ITM significantly improves the partial pressure driving force, practical reactor engineering considerations indicate that this concept is not superior to counter-current separation-only ITMs, mainly because of the stringent temperature limitations of the membrane material; however, the temperature limit was acceptable in case of co-current flow.

Akin and Jerry (Akin F T, Jerry, Lin Y S. Oxygen permeation through oxygen ionic or mixed-conducting ceramic membranes with chemical reactions. Journal of Membrane Science, 2004, 231, 133-146, incorporated herein by reference) presented a simple mathematical analysis, coupled with experimental data, on the effects of hydrocarbon flow rate and reactivity with oxygen on the oxygen permeation in an ionic or mixed conducting ceramic membrane reactor for partial oxidation of hydrocarbon. In their work, Oxygen permeating through the BYS membrane reacted with methane or ethane, with main reaction being oxidative coupling of methane (OCM) in the former (Akin F T, Lin Y S. Oxidative coupling of methane in dense ceramic membrane reactor with high yields. AIChE J. 2002, 48, 2298-2306, incorporated herein by reference) and selective oxidation of ethane (SOE) to ethylene for the latter (Akin F T, Lin Y S. Selective oxidation of ethane to ethylene in a dense tubular membrane reactor. J. Membrane Sci. 2002, 209, 457-467, incorporated herein by reference). They showed that for a membrane under reaction conditions with a specific reducing gas, the oxygen permeation flux depends strongly on the oxidation reaction rate and the reducing gas flow rate.

In order to address the deficiencies and drawbacks of conventional oxycombustors the present inventors disclose an oxygen transport reactor for the conversion of liquid fuels into energy while capturing the $CO_2$. The oxygen transport reactor has two functions: $CO_2$ separation and fuel reaction with $O_2$. Cylindrical reactor walls made of dense, nonporous ceramic membranes allow only oxygen permeation from the outside air into the combustion chamber. The liquid fuel is sprayed and evaporated in the permeate side inside a porous pipe. The permeate oxygen burns in a mixture of $CO_2$ and fuel (sweep gas) that enters the reactor resulting in combustion products composed of $H_2O$ and $CO_2$. A complete design for a water tube boiler utilizing an oxygen transport reactor is provided.

SUMMARY

One embodiment of the disclosure includes a liquid fuel oxygen transport reactor including an outer oxygen transport membrane, an inner porous membrane, a liquid fuel injector, and a gas-assisted fuel atomizer;

In another embodiment of the disclosure the liquid fuel oxygen transport reactor includes an inner porous membrane positioned inside the outer oxygen transport membrane to form an annulus.

In another embodiment of the disclosure the liquid fuel oxygen transport reactor includes a liquid fuel injector and a gas-assisted fuel atomizer located at the upstream end of the inner porous membrane.

In another embodiment of the disclosure the liquid fuel oxygen transport reactor includes an inner porous membrane configured to pass a gaseous fuel and an outer oxygen transport membrane configured to separate oxygen from a feed gas and pass the oxygen into an annulus.

In another embodiment of the disclosure the liquid fuel oxygen transport reactor includes an annulus that defines a combustion chamber in which the oxygen passed through an outer oxygen transport membrane and a fuel passed through an inner porous membrane react.

In another embodiment of the disclosure the liquid fuel oxygen transport reactor includes a sweep gas injector at a downstream end of an outer oxygen transport membrane configured to inject an inert sweep gas into an annulus countercurrent with a combustion gas exiting the annulus.

In another embodiment of the disclosure the liquid fuel oxygen transport reactor includes an inner porous membrane closed at a downstream end.

In another embodiment of the disclosure the liquid fuel oxygen transport reactor includes an annulus closed at an upstream end of an outer oxygen transport membrane and open at a downstream end of an outer oxygen transport membrane.

Another embodiment of the disclosure includes a combustion chamber containing a plurality of oxygen transport reactors.

In another embodiment of the disclosure the combustion chamber includes oxygen transport reactors positioned inside a combustion chamber defined by a wall of the combustion chamber encompassing outer oxygen transport membranes of the oxygen transport reactors.

Another embodiment of the disclosure includes a gas turbine containing a plurality of the oxygen transport reactors positioned along a perimeter to provide mechanical energy for the generation of electricity or compression power.

Another embodiment of the disclosure includes a boiler furnace having a plurality of the oxygen transport reactors, evaporators, turbine/compressor units, and a fuel distributor The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
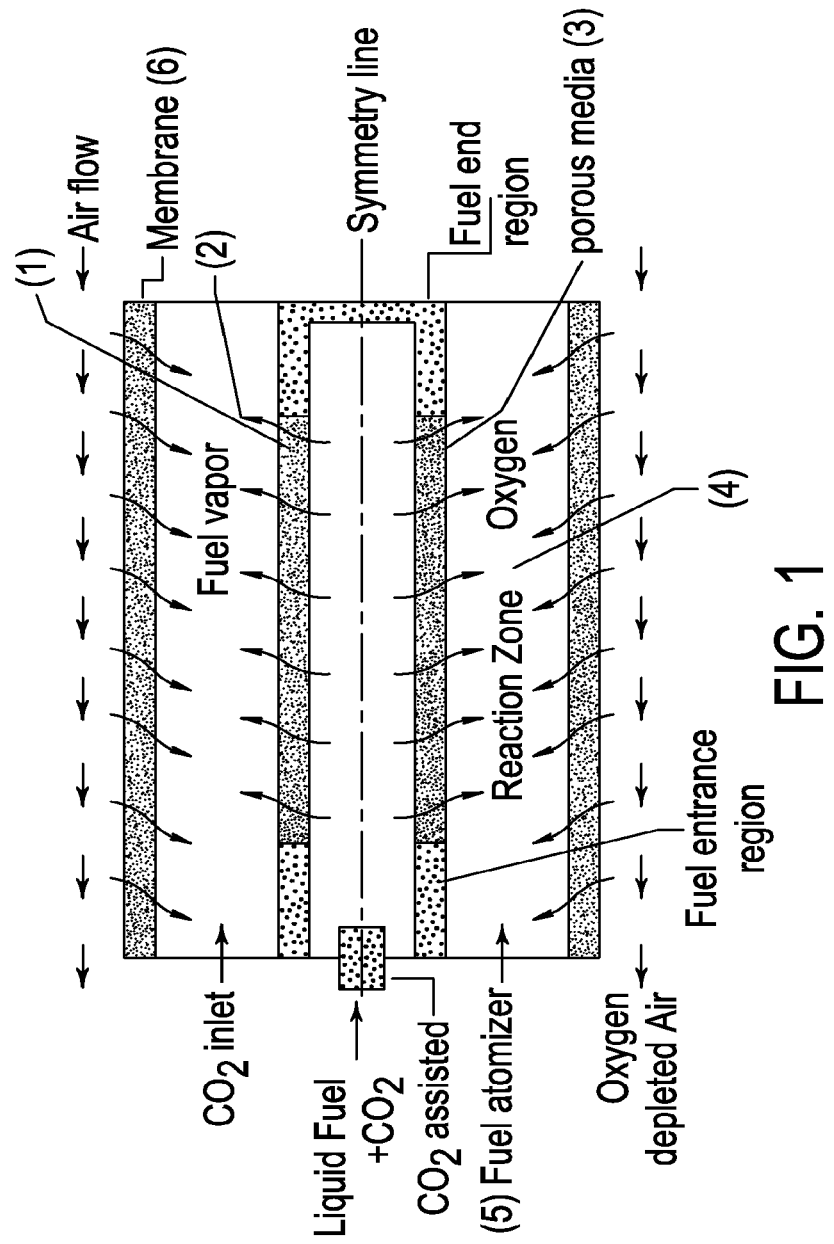
FIG. 1 shows a single oxygen transport reactor (OTR) embodiment of the invention.

Referring now to the drawings, wherein like reference numerals designate identical or corresponding parts throughout the several views.

Conventional combustors of gas turbines and boiler furnaces are composed of fuel and air burners that are used to burn the liquid fuel producing exhaust gases composed mainly of carbon dioxide, nitrogen and water vapor. In order to separate the carbon dioxide of this mixture several energy-demanding chemical processes are required. In the present disclosure the conventional combustors and furnaces are replaced by furnaces and/or reactors that provide the ability of burning liquid fuel with oxygen to produce carbon dioxide and water vapor which can be easily separated through condensing the water vapor via simple cooling processes. Thus, carbon dioxide can be captured.

The present disclosure includes a carbon-free liquid fuel combustor which utilizes oxygen transport reactors for online and combined oxygen separation and combustion. While conventional combustors/reactors utilize gaseous fuels in membrane reactors; the present disclosure describes the use of a liquid fuel introduced by vaporizing the fuel inside a porous pipe surrounded by an annulus reaction zone which is surrounded by an annulus air zone as shown in FIG. 1.

An oxygen transport membrane (6) separates an annulus reaction zone (4) containing a porous vaporized fuel from an outside air feed zone and a gaseous sweep (e.g., $CO_2$). The oxygen transport membrane permits selective transport of oxygen from an outside air (feed) flow zone through the membrane to the annulus reaction zone containing the vaporized fuel and the sweeping $CO_2$. Liquid fuel is first cracked and/or atomized to very small droplets in the intake fuel atomizer (5) utilizing part of the intake $CO_2$ then, prior to entry into the annulus reaction zone, the fuel is completely vaporized inside the porous pipe (3) utilizing the heat coming from the surrounding reaction/annulus zone.

In the combustor, the combustion occurs at the surface of the oxygen transport and/or porous membranes and the temperature is not as high in comparison to combustion carried out in volume with oxygen. The dilution of combustion gases that is required in conventional combustion units may not be needed in the combustor disclosed herein and may be done only if more uniform temperature along the combustor is required and, in this case, is done using carbon dioxide rather than air.

Figure 2:
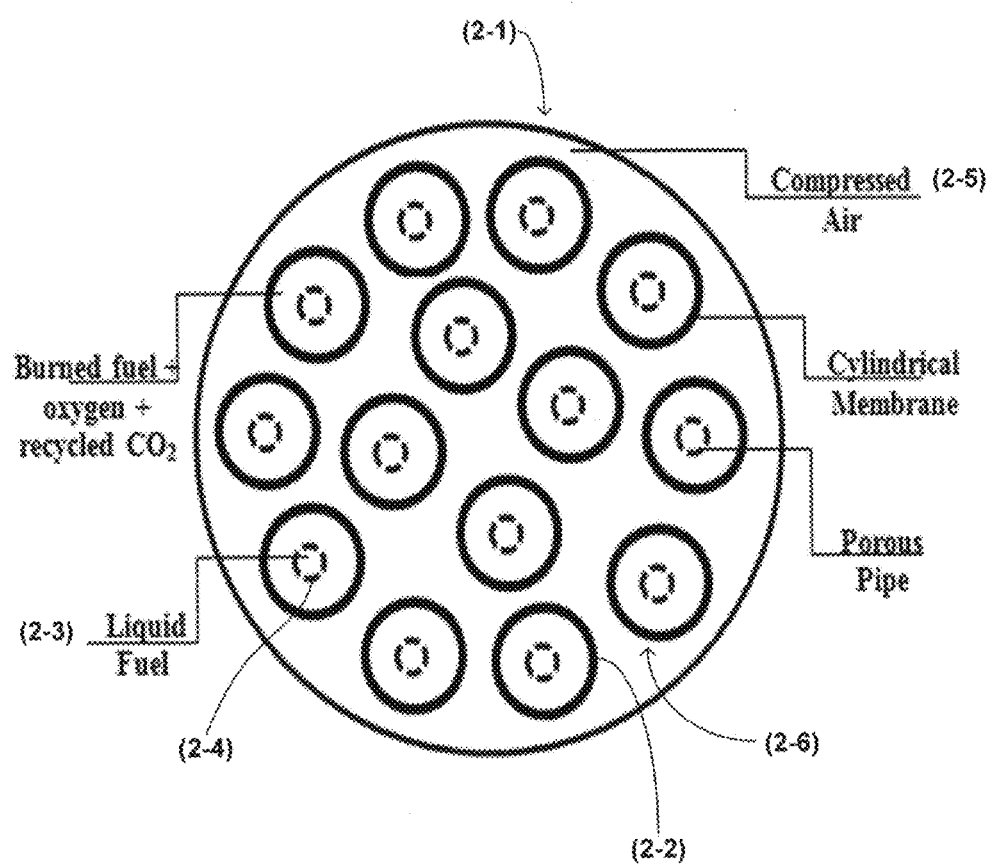
FIG. 2 shows a single combustor burner having multiple oxygen transport reactors.
Figure 3:
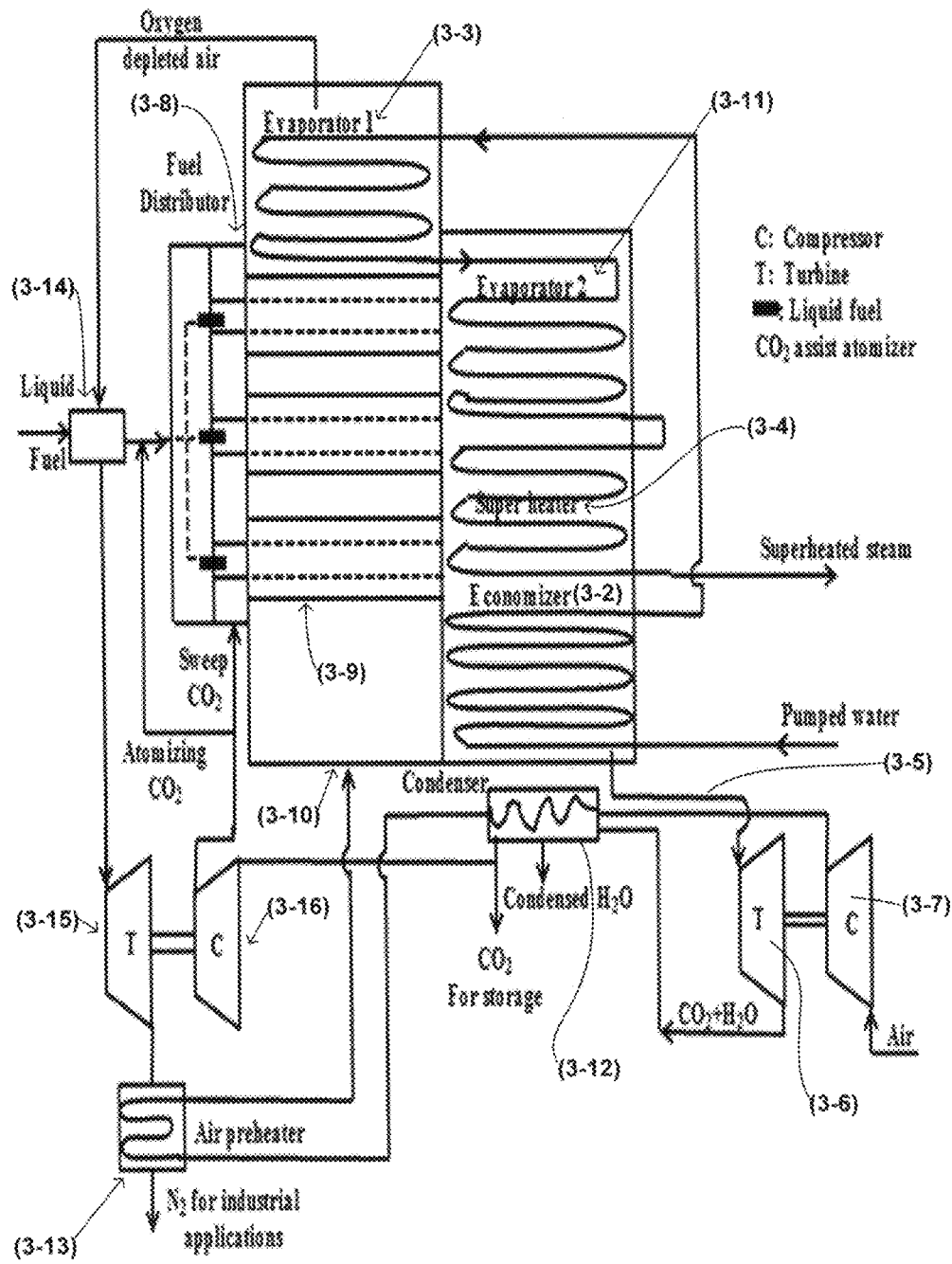
FIG. 3 shows a schematic of a carbon-free liquid fuel water tube boiler.

Embodiments of the disclosure are shown schematically in FIGS. 1 to 3. FIG. 1 presents a single oxygen transport reactor where liquid is atomized and evaporated inside a porous pipe (1). The evaporated fuel (2) passes across the porous surface to the reaction zone (4) to be burned with the permeated oxygen in $CO_2$ medium. Part of the recirculated $CO_2$ is mixed with the fuel through the fuel atomizer (5) to help in the atomization process using $CO_2$ assisted atomizer. Also, the recirculated $CO_2$ is used in increasing the temperature of the membrane surface (6) at the entrance of the combustor to enhance the combustion process and to provide flame stability and to avoid lifted flames. Oxygen transported across the membrane thickness is directly burnt with the fuel resulting in low oxygen concentration and, consequently, low oxygen partial pressure. Thus, the oxygen flux is increased as the oxygen partial pressure ratio across the membrane remains high.

FIG. 2 presents the combustion chamber (or burner) (2-1) which is a multiple combustors along the perimeter of a gas turbine unit in case of gas turbine application. This simulates the combustion chamber in a conventional gas turbine unit or a boiler furnace combustor. FIG. 2 presents a single combustor. The combustor is formed of multiple oxygen transport reactors (2-2). Fuel (2-3) enters at the middle section (2-4) and is distributed among the fuel atomizers through the oxygen transport reactors (OTRs) (2-2). Air flows (2-5) outside the fuel distributor and spreads around the oxygen transport reactors (OTRs). As oxygen is depleted from the air stream, the remaining nitrogen (oxygen depleted air) that exits the combustors is collected and used for heating the liquid fuel and the compressed combustion air and, thus, to improve the system efficiency. The nitrogen is then removed to the atmosphere or utilized in other industries such as the production of fertilizers.

FIG. 3 presents a boiler furnace for producing superheated steam for steam turbine operation and/or for process heat). The gases are first used to boil water in an evaporator (3-3), then they are used to superheat steam in a superheater (3-4). An economizer (3-2) is used to utilize the heat in the gases before leaving the boiler. The mixture of carbon dioxide and water (3-5) vapor exiting the furnace is utilized to produce power using a turbine (3-6). The power is utilized to run the air compressor (3-7), thus, system efficiency is improved. The waste energy in the oxygen depleted air is recovered in heating the compressed air and the liquid fuel. The stream of the mixture of fuel and recirculated carbon dioxide enters into the fuel box (fuel distributor) (3-8) and then flows inside the oxygen transport reactors (3-9). The air enters to the annulus air box (3-10) surrounding the fuel box and flows in an opposite direction to the fuel stream into the volumes surrounding the oxygen transport reactors.

Each oxygen transport reactor includes an outer oxygen transport membrane that surrounds an inner porous membrane. An annulus is formed between the outer membrane and the inner porous membrane. The outer membrane serves to separate oxygen from a gaseous mixture such as air to form an outside oxygen-depleted atmosphere and an inside (annulus) oxygen-rich atmosphere. The oxygen from permeates the outer membrane and enters the annulus between the outer membrane and the inner porous membrane. Preferably the outer membrane permits passage of only oxygen gas and separates the oxygen gas from other gases such as nitrogen, carbon dioxide and/or other gaseous materials present in ambient air.

The outer membrane is an ion transport membrane that permits passage of oxygen while prohibiting passage of other gaseous materials such as nitrogen and carbon dioxide. The ion transport membrane is preferably a ceramic material in the form of a cylindrical pipe although other shapes such as ovoid or square are possible. The ion transport membrane is preferably a ceramic ion transport membrane such as that described by composition in U.S. Pat. Nos. 5,723,074; 5,702,999; 5,306,411; or 4,791,079 (each of which is incorporated herein by reference in its entirety). For maximum efficiency a cylindrical pipe is preferred. The ion transport membrane forms a cylinder may be open on both ends or closed on an upstream end and open on a downstream end. The outer diameter of the outer membrane/ion transport membrane is not limited.

The air flow which passes by the exterior of the outer membrane may be pre-enriched with oxygen. For example, in one embodiment the air flow which is contacted with the ion transport membrane may have been pre-treated with a polymeric-type membrane operating at relatively lower temperatures than the outer membrane to thereby provide an air flow that is pre-enriched with oxygen and thus operates more efficiently with respect to entraining oxygen in the annulus for reaction with a gaseous fuel.

Preferably the ratio of the inner diameter of the outer membrane and the inner diameter of the porous membrane is 20:1, preferably 15:1, more preferably 10:1, 5:1 or 2:1. The thickness of the outer membrane is not critical. Preferably the ratio of the thickness of the outer membrane to the diameter of the outer membrane is 0.1:1, more preferably 0.05:1, 0.01:1, 0.005:1, 0.001:1.

The length of the oxygen transport reactor and/or the length of the ion transport membrane is not limited. Preferably the ratio of the length of the outer membrane to the outer diameter of the outer membrane is 100:1, preferably 50:1, 25:1, 10:1, 5:1, 1:1 or 0.5:1.

The atmosphere inside the annulus between the outer membrane and the porous membrane includes a fuel vapor and, optionally, one or more sweep gases. The sweep gas serves to dilute the oxygen passing through the outer membrane and thereby lowers the partial pressure of oxygen in the annulus. In one embodiment of the disclosure the air flow on the outside of the outer membrane is at a pressure greater than the pressure in the annulus. Preferably the difference in pressure between the pressure of the outside atmosphere and the annulus is 10:1, 5:1, 2:1 or 1.5:1.

One or more additional gases may be added as a sweep gas at the downstream or upstream end of the annulus. Preferably one or more inert gases is injected into the annulus in a counter-current fashion at the downstream end. Inert gases in the context of the present disclosure indicate a gas that does not react with the fuel vapor that is present in the annulus. The sweep gas serves to carry away heat and/or combustion byproducts formed by reaction of the oxygen and fuel vapor present in the annulus.

Fuel vapor enters the annulus by passage through the porous membrane. The porous membrane may be constructed of a sintered material such as a sintered metal or ceramic. Passage of atomized or vaporous fuel through the porous membrane into the annulus forms a combustible mixture that includes the oxygen-rich gases passing through the outer membrane and the fuel passing through the porous membrane. Preferably all of the fuel that enters the annulus is in vapor form. Ignition of the combustible gaseous mixture leads to combustion of the fuel to form a mixture of carbon dioxide and water. Combustion releases substantial amounts of heat which can be removed at least in part using one or more sweep gases such as carbon dioxide which is injected at a downstream or upstream location to sweep heat and combustion products from the annulus. Ordinarily during operation the oxygen transport reactor is at a high temperature and thus improves the performance of both the outer membrane and the porous membrane. Annulus/combustion temperatures ranging from 500-1,500° C. are preferred, more preferably 600-1,400, 700-1,300, 800-1,200, 900-1,100 or about 1,000° C.

The heat of combustion heats both the outer membrane and the porous membrane. The outer membrane functions at peak performance at temperatures greater than 300° C., e.g., 300-700, preferably 400-500° C. At even higher temperatures the outer membrane may function more effectively to separate oxygen from air and pass a greater amount of oxygen into the annulus. In order to counter-effect the increased oxygen content on combustion the amount of sweep gas may be increased and/or the sweep gas may be used in an amount that is effective for maintaining a stable temperature in the annulus and/or in any sweep gases exiting from the annulus.

The fuel may be, for example, a hydrocarbon based material that is first injected into a cavity surrounded by the porous membrane in the form of a liquid. Liquid hydrocarbon fuels include compressed materials such as methane, ethane and propane and also include hydrocarbon fuels that are ordinarily liquid at room temperature such as pentane, hexane, heptane and octane. In other embodiments of the disclosure the liquid fuel may include a high burning material such as a crude oil distillate or crude oil fraction having a high boiling point. The inner membrane is preferably closed at both ends and defines a space to encompass and contain the liquid and/or atomized fuel that moves in a counter-current fashion with respect to air flowing across the outer membrane. The downstream end of the porous membrane, which is preferably capped, represents the upstream end of the annulus and the upstream end of the outer membrane. The enclosed space formed by the inner porous membrane is preferably closed on both ends such that fuel and/or fuel vapor does not escape at the downstream end. The upstream end is preferably enclosed to hold a liquid fuel injector and/or liquid fuel atomizer.

Countercurrent flow of fuel and permeate oxygen permit oxygen recovery ratios of more than 50%, preferably 75% or more. Such counter-current flow compares with oxygen recovery ratios of only around 25% for reactors which utilize co-current oxygen and fuel flow.

Combustion of the gaseous fuel in an environment which is oxygen-enriched and includes only minor amounts of secondary gases such as nitrogen (although a sweep gas may separately be present) permits combustion to occur with substantially no formation of carbon deposits.

Prior to injection into the space defined by the inner porous membrane, the fuel is atomized and/or cracked to form small droplets. Formation of small droplets aids to obtain complete evaporation of the fuel as it passes through the porous membrane. The porous membrane, like the outer membrane, is in direct contact with the annulus and forms one wall thereof. The inner membrane is therefore at a substantially elevated temperature such as 500-1,500° C., 600-1,400° C., 700-1,300° C., 800-1,200° C., 900-1,100° C. or about 1,000° C. As the liquid fuel droplets contact the porous membrane, quick evaporation occurs such that fuel vapor quickly permeates the porous membrane and enters the annulus for reaction with oxygen.

In one embodiment of the disclosure, the only material that is injected into the space defined by the inner membrane is the liquid fuel. In other embodiments the liquid fuel is injected together with one or more gases to improve combustion, smooth combustion and/or transport liquid fuel droplets down the entire length of the inner transport membrane. Preferably the atomizer functions by injecting carbon dioxide gas into the liquid fuel as it is injected into the space defined by the porous membrane. The injection preferably represents co-injection of both a liquid fuel and an insert gaseous material such as carbon dioxide, more preferably carbon dioxide gas obtained from the combustion of fuel with oxygen in the annulus.

The fuel is preferably injected into the space defined by the porous membrane at a pressure greater than the pressure of the annulus which surrounds the porous membrane. The ratio of pressure inside the fuel injection chamber in relation to the pressure in the annulus is, for example, 10:1, 5:1, 2.5:1, or 1.5:1.

The temperature gradient across the length of the porous membrane and the outer membrane is preferably ±10% defined as a variance between the highest temperature along the length of the porous membrane and the lowest temperature along the length of the porous membrane. In other embodiments the temperature difference, gradient, across the length of the porous membrane is no more than 5%, 2%, 1% or 0.5%.

As a result of even combustion occurring down the length of the annulus any temperature gradient down the axial length of the oxygen transport reactor is minimized. Such temperature gradients are further minimized and/or controlled by the use of a sweep gas to remove and/or collect heat and/or materials formed during the combustion.

One or more of the oxygen transport reactors may be included in embodiments of the disclosure related to particular applications. For example, in one embodiment of the invention a plurality of oxygen transport reactors are located around the perimeter of a turbine. The hot exhaust gases formed by the combustion of the fuel inside the oxygen transport reactor provide a gaseous flow across turbine blades to, for example, generate electricity or mechanical power by turning the turbine. In another embodiment one or more oxygen transport reactors is used in a boiler such as an industrial water tube boiler to harvest the heat from the combustion of the fuel in the annulus.

In embodiments in which a plurality of oxygen transport reactors are used, a fuel distributor is preferably used to connect each oxygen transport reactor in parallel rather than in series. The fuel distributor may serve to distribute atomized fuel to each individual oxygen transport reactor of a plurality of reactors or alternately may serve both to distribute fuel and to atomize the fuel separately for each oxygen transport reactor. Most preferably the fuel distributor and/or fuel atomizer both utilize recycled carbon dioxide formed during the combustion of the liquid fuel.

Subsequent to passage across the ion transport membrane, the outside air flow is depleted in oxygen and relatively enriched in other gases such as nitrogen and carbon dioxide. The oxygen-depleted gas stream may be used for applications such as the synthesis of fertilizers and/or as a sweep gas for removing heat from the oxygen transport reactor.

The sweep gas also serves to maintain the temperature in the annulus or at any of the outer membrane or the porous membrane. Damping the temperature using the sweep gas permits maximal efficiency with respect to extracted heat and fuel cost.

The sweep gases and/or combustion gases exiting from the annulus may be recirculated to an upstream point of the annulus and/or recirculated for downstream injection counter-current to the air flow across the outside of the outer membrane. Recirculation of sweep gases further serves to conserve heat and/or dampen the combustion reaction between oxygen and vaporized fuel. The sweep gases may also be used to preheat the air flow or gaseous flow which is used as a source for oxygen. In this respect one or more combustion gases exiting with the sweep gas may be directly injected into air to preheat the air passing over the outer membrane. In other embodiments sweep gases are passed through a heat exchanger which is contacted with the air flow prior to passage across the outer membrane. The sweep gases, especially carbon dioxide, may also be used to preheat the liquid fuel prior to injection into the fuel space defined by the porous membrane.

The gases exiting the annulus preferably consist of carbon dioxide and water with complete reaction of oxygen and vaporized fuel. The resulting sweep gas and/or combustion gas flow exiting the annulus is therefore substantially enriched in carbon dioxide. This gaseous flow may be used as a source for carbon capture and/or carbon sequestration. Gases leaving the annulus may also be treated to condense and remove water vapor to leave a gaseous flow that is substantially carbon dioxide.

The insertion of carbon dioxide as a sweep gas in counter-current fashion to the air flow substantially reduces the oxygen concentration in the annulus. At least two important benefits derive from the use of carbon dioxide as a counter-current sweep gas. A reduction in oxygen concentration in the annulus ensures that the ion transport membrane functions efficiently to separate oxygen from the air flow or gaseous flow passing over the exterior of the outer membrane. By lowering the partial pressure of oxygen, the efficiency of the ion transport membrane is improved. Further, a low concentration of oxygen in the annulus serves to ensure smooth reaction of vaporized fuel with oxygen gas. Smooth reaction results in a stable temperature profile across both the ion transport membrane and the porous membrane with little or no temperature gradient. In the oxygen transport reactor of the present disclosure low permeate partial pressure (i.e., low oxygen partial pressure) corresponds with low partial pressure of vaporized fuel. Matching the partial pressure and/or concentration of oxygen with vaporized fuel provides a stable combustion chamber and only minor temperature gradients with stable reaction.

The air flow passing across the outer membrane may be compressed and/or preheated with carbon dioxide or sweep gases exiting from the annulus. Compression for the exterior air flow may be driven by the combustion gases exiting the annulus. Exiting combustion gases may power a turbine which functions to compress the air prior to flow across the outer membrane. The resultant oxygen-depleted air flow may likewise be used as a source of heat or energy to realize further efficiencies in the oxygen transport reactor. For example, the oxygen-depleted air may be used to preheat air flow prior to passage across the outer membrane. Likewise, any compressed air after passage across the outer membrane may be used for its mechanical or thermal energy.

The oxygen transport reactor of the present disclosure may be included as one component of a combustion/furnace system (see for example FIG. 3). In contrast to conventional furnaces and/or combustion systems, the use of a plurality of the oxygen transport reactors provides efficient and stable combustion with little or no carbon formation and/or NOx formation. The use of a plurality of oxygen transport reactors also permits realization of efficiencies to make up for any low flux of oxygen through the ion transport membrane.

The sources of heat may be captured as shown in FIG. 3. For example, in FIG. 3 two evaporators are described. A first evaporator (3-3) utilizes heat derived from the combustion reaction. A second evaporator (3-11) utilizes heat derived from the oxygen-depleted stream. The evaporators may function at different temperatures and/or pressures and thereby provide evaporation streams of different energy and temperature.

FIG. 3 further shows the use of combustion gases to mechanically turn a turbine (3-6) which itself is connected to a compressor (3-7). In FIG. 3 the compressor (3-7) is used to pre-compress air prior to flow across the outer membrane. The air may be purified and/or treated by passage through a condenser (3-12), passage through a polymeric ion transport membrane to form an oxygen-enriched air flow and/or preheating by direct or indirect contact with a combustion gas exiting the oxygen transport reactor annulus or oxygen-depleted air after passage over the outer membrane of the oxygen transport reactor.

As shown in FIG. 3 the oxygen-depleted air may be used to preheat the liquid fuel prior to distribution and/or atomization. The oxygen-depleted air may likewise be used to mechanically turn a second turbine (3-15) optionally connected to a compressor (3-16) which functions to compress a gas such as a sweep gas (carbon dioxide) used to aid in atomizing and/or vaporizing the liquid fuel prior to or concurrent with injection into the space defined by the porous membrane.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:
1. A liquid fuel oxygen transport reactor, comprising:
an outer oxygen transport membrane in the form of a cylinder having an upstream end and a downstream end,
an inner porous membrane in the form of a cylinder having an upstream end and a closed downstream end,
a liquid fuel injector, and
a gas-assisted fuel atomizer;

wherein the inner porous membrane is positioned inside the outer oxygen transport membrane to form an annulus between the outer oxygen transport membrane and the inner porous membrane, wherein the upstream end of the inner porous membrane is positioned at the downstream end of the outer oxygen transport membrane, wherein the liquid fuel injector and the gas-assisted fuel atomizer are located at the upstream end of the inner porous membrane, wherein the inner porous membrane is configured to pass a gaseous fuel and the outer oxygen transport membrane is configured to separate oxygen from a feed gas and pass the oxygen into the annulus, and wherein the annulus defines a combustion chamber in which the oxygen passed through the outer oxygen transport membrane and the gaseous fuel passed through the inner porous membrane react.

2. The liquid fuel oxygen transport reactor of claim 1, further comprising:
a sweep gas injector at a downstream end of the outer oxygen transport membrane configured to inject an inert sweep gas into the annulus countercurrent with a combustion gas exiting the annulus.

3. The liquid fuel oxygen transport reactor of claim 1, wherein the annulus is closed at an upstream end of the outer oxygen transport membrane and is open at a downstream end of the outer oxygen transport membrane.

4. A combustion chamber, comprising:
a plurality of the liquid fuel oxygen transport reactors of claim 1,
wherein the plurality of the liquid fuel oxygen transport reactors are positioned inside the combustion chamber in a space defined by a wall of the combustion chamber encompassing the outer oxygen transport membranes of the plurality of the liquid fuel oxygen transport reactors, and the space is configured to carry a compressed gas flow to supply oxygen for combustion of the gaseous fuel inside the annuli of the plurality of the liquid fuel oxygen transport reactors.

5. A gas turbine unit, comprising:
a plurality of the liquid fuel oxygen transport reactors of claim 1,
wherein the plurality of the liquid fuel oxygen transport reactors are positioned along a perimeter of the gas turbine unit to provide mechanical energy to the gas turbine unit for the generation of electricity or compression power.

6. A boiler furnace, comprising:
a plurality of the liquid fuel oxygen transport reactors of claim 1,
first and second evaporators,
first and second turbine/compressor units, and
a fuel distributor,
wherein the fuel distributor is connected to a liquid fuel source and distributes a liquid fuel to the liquid fuel injector of each liquid fuel oxygen transport reactor arranged in parallel,
wherein the first evaporator is in thermal contact with an oxygen-depleted gas flow and the second evaporator is in thermal contact with a combustion gas exiting the annulus of the plurality of the liquid fuel oxygen transport reactors,
wherein the first turbine/compressor unit is in fluid communication with a super-heated steam formed by the first and/or second evaporator to provide energy to a first compressor to compress an air flow passing across the outer oxygen transport membrane,
wherein the second turbine/compressor unit is in fluid communication with an oxygen-depleted air flow from the downstream end of the outer oxygen transport membrane and provides mechanical energy to a compressor to compress one or more sweep gases obtained from combustion in the annuli of the plurality of the liquid fuel oxygen transport reactors and injection into the gas-assisted fuel atomizers of the plurality of the liquid fuel oxygen transport reactors.

* * * * *